W. H. McCONNAUGHY.
CRUMB COLLECTOR.
APPLICATION FILED JAN. 26, 1915.
1,206,343.
Patented Nov. 28, 1916.
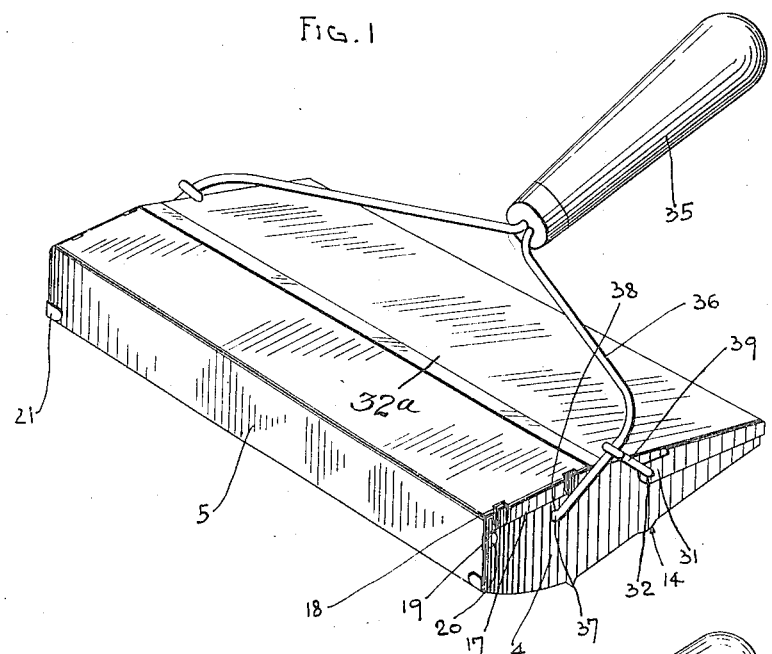
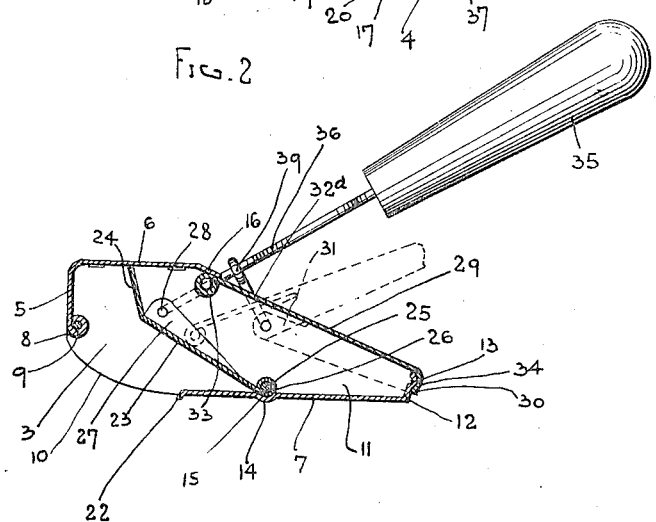
WITNESSES
Frank Frimmer
Marie H. Zbiera
INVENTOR
W. H. McCONNAUGHY
Max H. Srolovitz
ATTORNEYS

UNITED STATES PATENT OFFICE.

WALTER H. McCONNAUGHY, OF PITTSBURGH, PENNSYLVANIA.

CRUMB-COLLECTOR.

1,206,343.  Specification of Letters Patent.  Patented Nov. 28, 1916.

Application filed January 26, 1915. Serial No. 4,514.

*To all whom it may concern:*

Be it known that I, WALTER H. McCONNAUGHY, a citizen of the United States, residing at Pittsburgh, in the county of Allegheny and State of Pennsylvania, have invented certain new and useful Improvements in Crumb-Collectors, of which the following is a specification.

This invention relates to a crumb collector, more particularly to an improvement upon the form of crumb collector disclosed in Letters Patent No. 1,013,195, granted to me January 2nd, 1912, and besides embodying the objects set forth in said Letters Patent has for its further object to provide, in a manner as hereinafter set forth, a simple and inexpensive device for collecting and retaining crumbs and other material from a table cloth or other surfaces without marring or otherwise injuring it, and to further provide a crumb collector which is capable of being readily cleaned when occasion requires.

A further object of the invention is to provide a collecting tray with a trap member in a manner as hereinafter set forth, for retaining the collected contents therein while the tray is being transported, and to further provide the tray with shiftable means in a manner as hereinafter set forth, capable of being actuated in one direction to permit of the discharging of the collected contents from the tray and to further engage the trap member to prevent movement thereof during such discharging step.

Further objects of the invention are to provide a collecting tray for the purpose set forth which is capable of being ornamental, strong, durable, readily manipulated, and efficient in its use.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views, Figure 1 is a perspective view of a crumb collector in accordance with this invention. Fig. 2 is a horizontal sectional view thereof.

Referring to the drawings in detail the crumb collector consists of a tray including a pair of side walls 3, 4, a front wall 5, a top wall 6, and a bottom 7. The front wall 5 is a continuation of the top 6 and extends downward at right angles with respect to said top wall 6 and the lower terminus of said wall is bent to form a bead 8, having a reinforcement 9. The front wall 5 is of less height than the side walls 3, 4, thereby providing an entrance opening 10. The side walls 3, 4, are of greater length than the width of the top 6 and the rear portion of each of said side walls is triangular as indicated at 11. The bottom 7 is of less width than the length of the side walls 3, 4, and said bottom 7 has the rear portion thereof bent upward at inclinations as at 12 to provide the back wall of the tray. The said back wall is offset as at 13 to form a rib on its outer face. The bottom 7 terminates at a point removed with respect to the plane of the front wall 5 and owing to the width of said bottom 7 and the point at which the forward end thereof terminates with respect to the plane of the front wall 5, an enlarged entrance opening 10 is formed. The bottom 7 is depressed to provide a rib 14 on its outer face and a groove 15 on its inner face. The rib 14 and groove 15 extend in a plane parallel to the plane of the front wall.

The top 6 has a rear portion thereof bent downwardly at an inclination as at 16 and which extends upon the top edge of each of the side walls 3, 4. The top 6 has each end thereof bent downward to form a flange 17 and said flanges 17 abut against the outer faces at the side walls 3, 4. The top 6 of each end is furthermore provided with a pair of slots 18, through which extend bendable ears 19. These latter are integral parts of the side walls 3, 4, and when bent to overlap the flanges 17 detachably secure the top 6 to the forward portion of the top edges of the side walls 3, 4.

The front wall 5 at each end has a bendable ear 20, which when in position extends against the outer faces of the side walls 3, 4, and the side walls 3, 4, at their forward ends have bendable ears 21, which when in position engage the outer face of the front wall 5. The bendable ears 19, 20 and 21 detachably connect the top 6 to the front wall 5 and the forward portions of the side walls 3, 4.

To facilitate the entrance of the crumbs or other material into the tray, the forward edge of the bottom 7 of the tray is bent downward at a slight inclination as indicated at 22.

Arranged within the tray is a trap member consisting of a pair of angularly disposed lower and upper portions 23, 24, respectively, the former being disposed at an angle with respect to the latter and the normal position of the latter being at an inclination with respect to the side walls. The portion 23 has the lower terminus thereof bent to provide a bead 25, in which is arranged a reinforcement 26 providing a way for normally maintaining the trap member in the position shown in Fig. 2 and when in such position the bead 25 is seated in the groove 15. The portion 24 of the trap member, when the latter is in normal position, extends in close proximity to the lower face of the top 6. The portion 23 of the trap member has each end provided with a rearwardly projecting flange 27 of less length than the width of said portion 23 and each of said flanges is provided near its upper end with an opening 28 for the purpose to be presently referred to.

The reference character 29 denotes a lid, which is formed with a depending flange 30 overlapping the back wall 12 and a portion of the outer face of each of the side walls 3, 4. Each side of the flange 30 has an extension 31, formed with an opening 32 for the purpose to be presently referred to. That part of the lid 29, which is not flanged, is of less width than the distance between the side walls 2, 3, and extends under the inclined portion of the top 6. That part of the lid 29 which is of less width than the flanged portion of said lid is indicated at 32ª, and has its free end bent to provide a bead 33. The back of the flange 30 is offset to form a pocket 34 for the reception of the rib 13, whereby the flange can be detachably connected to the rear wall 12 and said rib 13 and said pocket 34 provides what may be termed a frictional latch or catch for the lid so that the latter will be maintained stationary unless pressure is applied to the reduced portion 32ª of the lid 29.

The reference character 35 denotes a handle, formed with a bail 36. The latter has each end thereof bent at right angles as at 37, and each of said angular portions 37, extend through an opening 38 formed in each side wall and engages in the opening 28 provided in a flange 27 whereby the trap member is pivotally supported at a point removed from its top by the free ends of the bail 36.

In the crumb collector described by Patent 1,013,195, the trap member and lid were joined to the side walls of the tray by rivets. This construction would not permit of the collector being easily cleaned and furthermore was expensive to manufacture. In the patent the handle or bail member engaged in the side walls of the tray. The construction as disclosed in this application allows of the collector being readily taken apart for cleaning purposes in view of the fact that the bail extends through the side walls of the tray and pivotally supports the trap member and that the bail carries means for pivotally supporting the lid. The bail can be sprung apart and the means carried by the bail can be quickly detached from the lid and under such conditions separating the elements of the collector so that they can be cleaned when desired.

Fixedly secured to the bail 36 is a pair of rearwardly extending arms 39, each having its lower end bent at right angles and extend into an opening 32 of a projection 31 whereby the lid is pivotally supported from the bail 36.

When using the device it will be assumed that it is in the position shown in full lines in Fig. 2. It is moved along a table cloth or other surfaces and the crumbs collected will pass through the entrance opening 10 and by occasionally elevating the collector the trap member will swing open and allow the crumbs and other matter to enter the rear part of the device, and then by shifting the forward portion of the lid inwardly, as indicated in dotted lines, the trap member will be maintained stationary. When the forward portion of the lid is swung inwardly, the rear portion is elevated and the collected crumbs can be discharged from the rear of the tray.

What I claim is:—

1. A crumb collecting device comprising a tray having an opening at its front and an opening in its top at the rear thereof, said tray further having a groove in the upper face of its bottom, a trap member arranged within said tray and extending from the forward portion of the top to and normally snugly fitting in the groove in the bottom thereof, said trap member having end flanges below the top thereof, a shiftable lid normally closing said top opening and having its forward portion normally extending into the trap and capable when the lid is moved to open position to engage the trap member to prevent movement of the latter, said lid having its forward edge reinforced, a bail extending in said tray and engaging in said flanges for pivotally supporting said trap member, a handle connected to the bail, and means carried by the bail for pivotally supporting the lid exteriorly of the tray.

2. A crumb collecting device comprising a tray having an opening at its front and an opening in its top at the rear thereof, said tray further having a groove in the upper face of its bottom, a trap member arranged within said tray and extending from the forward portion of the top to and normally snugly fitting in the groove in the bottom thereof, said trap member having end flanges below the top thereof, a shiftable lid normally closing said top opening and having its forward portion normally extending into the trap and capable when the lid is moved to open position to engage the trap member to prevent movement of the latter, said lid having its forward edge reinforced, a bail extending in said tray and engaging in the upper end of said flanges for pivotally supporting said trap member, a handle connected to the bail, said lid having side flanges normally positioned exteriorly of the sides of the tray and each of said flanges formed with a forward projection, and means carried by the bail and engaging with said projections for pivotally supporting said bail.

3. A crumb collector comprising a tray having an opening at its front and its top provided with an opening at the rear thereof, a shiftable lid normally closing said rear opening, a trap member formed of an upper and lower portion angularly disposed with respect to each other, said trap member positioned in the tray and extending from the forward portion of the top to the rear portion of the bottom of the tray, said trap member having end flanges, a bail having its ends extending through the sides of the tray and through said flanges for pivoting said member, a handle connected to the bail, and means carried by the bail for pivotally supporting the lid, said means arranged exteriorly of the tray.

4. A crumb collector comprising a tray having an opening at its front and its top provided with an opening at the rear thereof, a shiftable lid normally closing said rear opening, a trap member formed of an upper and lower portion angularly disposed with respect to each other, said trap member positioned in the tray and extending from the forward portion of the top to the rear portion of the bottom of the tray, said trap member having end flanges, a bail having its ends extending through the sides of the tray and through said flanges for pivoting said member, a handle connected to the bail, and a pair of rearwardly extending arms carried by the bail and having angularly disposed ends for pivotally supporting the lid.

In testimony whereof I affix my signature in presence of two witnesses.

WALTER H. McCONNAUGHY.

Witnesses:
   MARIE H. ZBIERA,
   B. E. JENKINS.